United States Patent
Dai

(10) Patent No.: US 10,474,799 B2
(45) Date of Patent: Nov. 12, 2019

(54) METHOD AND SYSTEM FOR IDENTIFYING A UNIQUE MOBILE DEVICE BASED ON MOBILE DEVICE ATTRIBUTE CHANGES OVER TIME

(71) Applicants: Alibaba Group Holding Limited, Grand Cayman (KY); Jia Dai, Hangzhou (CN)

(72) Inventor: Jia Dai, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 143 days.

(21) Appl. No.: 15/554,686

(22) PCT Filed: Mar. 2, 2016

(86) PCT No.: PCT/CN2016/075378
§ 371 (c)(1),
(2) Date: Aug. 30, 2017

(87) PCT Pub. No.: WO2016/145993
PCT Pub. Date: Sep. 22, 2016

(65) Prior Publication Data
US 2018/0039766 A1    Feb. 8, 2018

(30) Foreign Application Priority Data
Mar. 13, 2015  (CN) .......................... 2015 1 0112435

(51) Int. Cl.
*G06F 21/31*     (2013.01)
*G06F 21/44*     (2013.01)
(Continued)

(52) U.S. Cl.
CPC ............ *G06F 21/316* (2013.01); *G06F 21/44* (2013.01); *H04L 67/303* (2013.01);
(Continued)

(58) Field of Classification Search
CPC .................................................. G06F 21/316
See application file for complete search history.

(56) References Cited

U.S. PATENT DOCUMENTS

| | | |
|---|---|---|
| 8,438,184 B1 | 5/2013 | Wang et al. |
| 8,756,657 B2 | 6/2014 | Bijlsma |

(Continued)

FOREIGN PATENT DOCUMENTS

| | | |
|---|---|---|
| CN | 101047526 A | 10/2007 |
| CN | 102710770 A | 10/2012 |

(Continued)

OTHER PUBLICATIONS

International Search Report to corresponding International Application No. PCT/CN2016/075378 dated Jun. 7, 2016 (2 pages).

(Continued)

*Primary Examiner* — Ali Shayanfar
(74) *Attorney, Agent, or Firm* — James J. DeCarlo; Greenberg Traurig, LLP

(57) ABSTRACT

The present application provides a method and a system for identifying a user device. The method comprises acquiring multiple device records ranked in chronological order; calculating time-domain feature information of a changed attribute value in the device records; calculating a difference value between values of an attribute before and after change according to the time-domain feature information of the changed attribute value in the device records; calculating a similarity of the device records according to difference values of all attributes in the device records; and identifying whether the device records belong to an identical device according to the similarity of the device records. As compared with current systems, the identification of a user device is done based on all the attributes of a device in which a similarity of device records is precisely calculated through a similarity weight that is constantly adjusted time sequences, thereby effectively reducing the misjudgment rate.

17 Claims, 4 Drawing Sheets

(51) Int. Cl.
*H04L 29/08* (2006.01)
*H04L 29/06* (2006.01)

(52) U.S. Cl.
CPC ............ *H04L 67/306* (2013.01); *H04L 63/08* (2013.01); *H04L 63/102* (2013.01)

(56) References Cited

U.S. PATENT DOCUMENTS

| | | |
|---|---|---|
| 8,838,967 B1 | 9/2014 | Mills et al. |
| 8,914,372 B2 * | 12/2014 | Cao ..................... G06Q 30/02 707/737 |
| 8,924,392 B2 * | 12/2014 | Dutta ..................... H04L 67/10 707/738 |
| 8,935,194 B2 | 1/2015 | Dasgupta et al. |
| 9,319,379 B1 | 4/2016 | Burcham et al. |
| 9,420,453 B2 | 8/2016 | Casey |
| 9,451,454 B2 | 9/2016 | Celi, Jr. et al. |
| 9,603,016 B1 * | 3/2017 | Mills ..................... G06F 21/44 |
| 9,892,172 B2 * | 2/2018 | Dwan ..................... G06F 16/2477 |
| 2006/0173872 A1 * | 8/2006 | Koike ..................... G06Q 30/02 |
| 2013/0124309 A1 | 5/2013 | Traasdahl et al. |
| 2014/0095320 A1 | 4/2014 | Sivaramakrishnan et al. |
| 2014/0149903 A1 * | 5/2014 | Ahn ..................... G06F 3/0488 715/765 |
| 2014/0279757 A1 * | 9/2014 | Shimanovsky ......... G06F 16/21 706/12 |
| 2015/0026330 A1 | 1/2015 | Ahmed et al. |
| 2015/0051976 A1 | 2/2015 | Brown |
| 2015/0095284 A1 * | 4/2015 | Namiki ................. G06F 16/258 707/627 |
| 2015/0248706 A1 | 9/2015 | Mi et al. |
| 2015/0341453 A1 | 11/2015 | Miller et al. |
| 2016/0019546 A1 * | 1/2016 | Eisen ................. G06Q 20/4016 705/44 |
| 2016/0162937 A1 | 6/2016 | Chawla |
| 2016/0182657 A1 * | 6/2016 | Mukherjee .............. H04L 67/22 709/223 |
| 2016/0191654 A1 * | 6/2016 | Healey .................. H04L 67/303 709/228 |
| 2016/0219411 A1 | 7/2016 | Tenant de la Tour et al. |
| 2017/0048708 A1 | 2/2017 | Ulrich et al. |

FOREIGN PATENT DOCUMENTS

| | | |
|---|---|---|
| CN | 103024090 A | 4/2013 |
| CN | 103428189 A | 12/2013 |
| JP | 2005229278 | 8/2005 |
| WO | 2014078569 A1 | 5/2014 |

OTHER PUBLICATIONS

European Extended Search Report to corresponding EP Application No. 16764174.5 dated Oct. 18, 2018 (13 pages).

* cited by examiner

METHOD AND SYSTEM FOR IDENTIFYING A UNIQUE MOBILE DEVICE BASED ON MOBILE DEVICE ATTRIBUTE CHANGES OVER TIME

CROSS-REFERENCE TO RELATED APPLICATIONS

This application claims the benefit of priority from Chinese Patent Application No. 201510112435.X, filed on Mar. 13, 2015 entitled "Method and System for User Device Identification," and PCT Application No. PCT/CN2016/075378, filed on Mar. 2, 2016 entitled "Method and System for User Device Identification," both of which are incorporated herein in their entirety by reference.

BACKGROUND

Technical Field

The present disclosure relates to the field of telecommunications, and in particular, to a method and a system for identifying a unique user device based on changes to the attributes of a user device over time.

Description of the Related Art

In recent years, large online shopping platforms such as TAOBAO and TMALL have rapidly developed. In order to ensure the security for online shoppers, each shopping platform needs to provide a robust security system to prevent users from fraudulent transactions. For example, information such as an electronic device type, an operating system, an IP address, an account number, and a delivery address of user's online transactions can be used to help the user avoid situations such as fraudulent transactions.

A user device ID refers to a globally unique ID generated using an appropriate device identification algorithm according to attribute information of a user device. The user device ID is added to a global database to serve as a user's identification. The electronic device of the user includes, but is not limited to, a PC, an IPAD, an IOS-type mobile phone, an ANDROID-type mobile phone, and so on. Therefore, the user device ID can serve as an effective anti-fraud tool. Even if the user changes his own purchase information such as the account number, the user name, and the delivery address, a corresponding device and previous purchase records of the user can still be identified according to the user device ID.

When the user accesses a specific web application, attribute information of the device (e.g., browser type, IP address, and operating system type) is usually acquired by a web server. Such attribute information represent important parameters for a device identification algorithm. Current device identification algorithms usually perform a calculation according to a similarity of device records to determine whether the device records belong to the same device. Specifically, existing device record identification algorithms generally include the following steps:

(1) selecting appropriate device attributes;
(2) preprocessing attribute data and determining what will be compared;
(3) selecting an appropriate similarity measurement function according to the attribute types;
(4) determining whether two device records match each other; and
(5) if a current device cannot be matched with an existing device in a database, creating a new ID for the current device record information and storing the attributes and the ID into the database.

In view of the above, the existing device identification algorithms assume the consistency of attributes; that is, that device attributes are to remain unchanged. If the device attributes change, current systems are likely to create a new device ID for a current device record. As a result, the error (i.e., misjudgment) rate is increased and two IDs for the same device will appear in the global database.

Although similarity measurement functions for measuring device attribute features are widely used, it is still difficult to determine a similarity weight for determining device attribute features due to the collected, limited device attribute feature information that provides limited clues, and the constant changes of device attributes, like normal system updates and man-made malicious modifications.

BRIEF SUMMARY

In view of the aforementioned disadvantages in current systems, the objective of the disclosed embodiments is to provide a method and a system for identifying a user device which can precisely identify whether a device of a user accessing a web application is the device that was previously used for accessing according to device attributes and a similarity weight that is constantly adjusted using time sequences, thereby effectively reducing the misjudgment rate.

In order to achieve the aforementioned objective and other relevant objectives, the disclosure provides a method for identifying a user device. The method comprises: acquiring multiple device records ranked in chronological order, wherein a device record comprises various attribute values of a device at a certain time and a corresponding timestamp; calculating time-domain feature information of a changed attribute value in the device records; calculating a difference value between values of an attribute before and after change according to the time-domain feature information of the changed attribute value in the device records; calculating a similarity of the device records according to the difference values of all attributes in the device records; and identifying whether the device records belong to an identical device according to the similarity of the device records.

In one embodiment, the time-domain feature information comprises one of a leap time of the changed attribute value in the device records and a stable time of the changed attribute value in the device records.

In one embodiment, the leap time comprises a time difference between times of two consecutive device records when a certain attribute value changes and the stable time comprises a duration for which a certain attribute remains unchanged after it leaps.

In one embodiment, the leap time of the attribute value in the device records is calculated using the following equation:

$$\Delta t_{leap} = r_i \cdot t - r_{i-1} \cdot t$$

wherein $r_{i-1} \cdot t$ and $r_i \cdot t$ represent respective timestamps for device records $r_{i-1}$ and $r_i$ before and after a certain attribute changes.

In one embodiment, an attribute value having a corresponding leap time less than or equal to a predetermined threshold is used when the similarity of the device records is calculated.

In one embodiment, the stable time of the attribute value in the device records is calculated using the following equation:

$$\Delta t_{stable} = r_j \cdot t - r_i \cdot t$$

wherein $r_j \cdot t$ and $r_i \cdot t$ represent respective timestamps of device records $r_j$ and $r_i$ when a certain attribute remains unchanged after it leaps, and wherein $j \geq i+1$.

In one embodiment, the difference value between values of an attribute before and after change is calculated using the following equation:

$$d(r \cdot a, r' \cdot a) = e^{-\mu \frac{\Delta t_{stable}}{\Delta t_{leap}}}$$

wherein $\Delta t_{leap}$ and $\Delta t_{stable}$ represent a leap time and stable time, respectively, of an attribute value for an attribute a in device records r and r', and wherein a represents a decay factor for an attribute value difference.

In one embodiment, calculating a similarity of the device records according to difference values of all attributes in the device records comprises defining a weight of a similarity of a certain attribute a in device records r and r' as w(r·a, r'·a)=d(r·a, r'·a), wherein d(r·a, r'·a) is a difference value between values of the certain attribute a in the device records r and r'; and calculating a similarity of the device records r and r' according to a device record similarity equation $$simR(r, r') = \frac{\sum_{a \in A} w(r \cdot a, r' \cdot a) * simA(r \cdot a, r' \cdot a)}{\sum_{a \in A} w(r \cdot a, r' \cdot a)}$$

wherein A is a device attribute set and simA(r·a, r'·a) is a similarity of the certain attribute a in the device records r and r'.

In one embodiment, the method further comprises setting a similarity threshold when an ID is allocated to a device according to the similarity of the device records; determining that the two device records belong to an identical device if a similarity of two device records is greater than the similarity threshold; and determining that the two device records belong to different devices and allocating different IDs to the different devices if a similarity of two device records is less than or equal to than the similarity threshold.

The disclosure further describes a system for identifying a user device, comprising: a first module, configured to acquire multiple device records ranked in chronological order, wherein a device records comprise various attribute values of a device at a certain time and a corresponding timestamp; a second module, configured to calculate time-domain feature information of a changed attribute value in the device records; a third module, configured to calculate a difference value between values of an attribute before and after change according to the time-domain feature information of the changed attribute value in the device records; a fourth module, configured to calculate a similarity of the device records according to difference values of all attributes in the device records; and a fifth module, configured to identify whether the device records belong to an identical device according to the similarity of the device records.

In one embodiment, the time-domain feature information comprises one of a leap time of the changed attribute value in the device records; and a stable time of the changed attribute value in the device records.

In one embodiment, the leap time comprises a time difference between the times of two consecutive device records when a certain attribute value changes; and the stable time comprises a duration for which a certain attribute remains unchanged after it leaps.

In one embodiment, the first module calculates the leap time of the attribute value in the device records using the following equation:

$$\Delta t_{leap} = r_i \cdot t - r_{i-1} \cdot t$$

wherein $r_{i-1} \cdot t$ and $r_i \cdot t$ represent respective timestamps for device records $r_{i-1}$ and $r_i$ before and after a certain attribute changes.

In one embodiment, an attribute value having a corresponding leap time less than or equal to a predetermined threshold is used when the similarity of the device records is calculated.

In one embodiment, the second module calculates the stable time of the attribute value in the device records using the following equation:

$$\Delta t_{stable} = r_j \cdot t - r_i \cdot t$$

wherein $r_j \cdot t$ and $r_i \cdot t$ represent respective timestamps of device records $r_j$ and $r_i$ when a certain attribute remains unchanged after it leaps, and wherein $j \geq i+1$.

In one embodiment, the fourth module calculates the similarity of the device records using the following steps:

defining a weight of a similarity of a certain attribute a in device records r and r' as w(r·a, r'·a)=d(r·a, r'·a), where d(r·a, r'·a) is a difference value between values of the certain attribute a in the device records r and r'; and calculating a similarity of the device records r and r' according to a device record similarity equation $$simR(r, r') = \frac{\sum_{a \in A} w(r \cdot a, r' \cdot a) * simA(r \cdot a, r' \cdot a)}{\sum_{a \in A} w(r \cdot a, r' \cdot a)}$$

wherein A is a device attribute set and simA(r·a, r'·a) is a similarity of the certain attribute a in the device records r and r'.

In one embodiment, when an ID is allocated to a device according to the similarity of the device records, a similarity threshold is set, and if a similarity of two device records is greater than the similarity threshold, it is determined that the two device records belong to an identical device; otherwise, it is determined that the two device records belong to different devices, and different IDs are allocated to the different devices.

As compared with current systems, the methods and systems for identifying a user device disclosed herein have the following beneficial effects: (1) time-domain feature information of a device attribute is defined as: a stable time and a leap time to acquire a difference value of the device attribute, and the difference value is used as a weight of a similarity of the device attributes; and (2) based on all attributes of a device, a similarity of device records is precisely calculated through a similarity weight that can be constantly adjusted with time sequences, thereby effectively reducing the misjudgment rate.

BRIEF DESCRIPTION OF THE DRAWINGS

Other features, objects, and advantages of the disclosure will become more apparent from the detailed description of non-restrictive embodiments made with reference to the following accompanying drawings.

The same or similar reference symbols in the drawings represent the same or similar parts.

DETAILED DESCRIPTION

Figure 1:
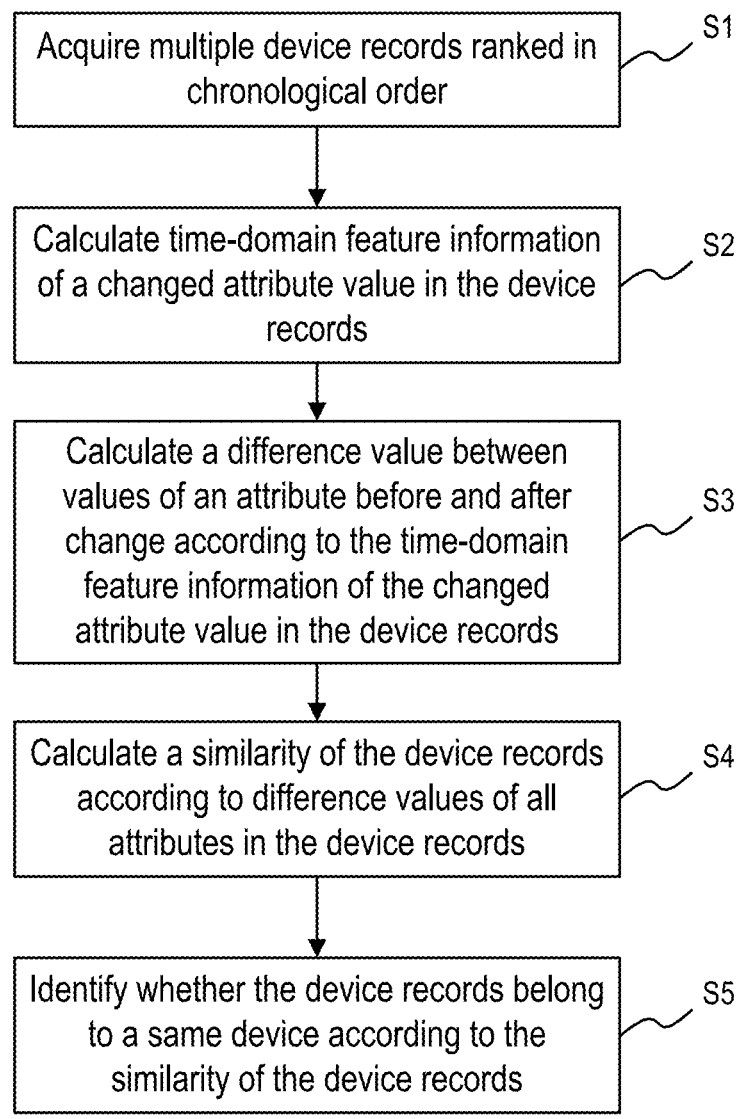
FIG. 1 is a flow diagram illustrating a method for identifying a user device according to some embodiments of the disclosure.

The embodiments of the disclosure are described in further detail below with reference to the accompanying drawings.

In a typical configuration of the disclosed embodiments, a terminal, a service network device, and a trusted party include one or more processors (CPUs), input/output interfaces, network interfaces, and memories.

The memory may include a computer readable medium in the form of a non-permanent memory, a random access memory (RAM), and/or a non-volatile memory, or the like, such as a read-only memory (ROM) or a flash memory (flash RAM). The memory is an example of a computer readable medium.

The computer readable medium includes permanent and non-permanent, movable and non-movable media that can achieve information storage by means of any methods or techniques. The information may be computer readable instructions, data structures, modules of programs or other data. Examples of a computer storage medium include, but are not limited to, phase-change memory (PRAM), static random access memory (SRAM), dynamic random access memory (DRAM), other types of random access memory (RAM), read-only memory (ROM), electrically erasable programmable read-only memory (EEPROM), flash memory or other memory technologies, read-only compact disc read-only memory (CD-ROM), digital versatile disk (DVD) or other optical storages, magnetic cassette, magnetic tape, magnetic disk storage or other magnetic storage devices, or any other non-transmission medium that can be used for storing information accessible by a computing device. In light of the definitions herein, the computer readable medium does not include non-transitory computer readable media (transitory media), such as modulated data signals and carrier waves.

Implementation of the disclosed embodiments are described below through specific examples, and those skilled in the art can easily understand other advantages and efficacies of the disclosed embodiments based on the contents disclosed in this specification. The disclosed embodiments can also be implemented or applied in other specific implementation manners; and various modifications or amendments may also be made to each of the details in this specification based on different perspectives and applications without departing from the spirit of the present application.

It is to be noted that the drawings provided in the disclosed embodiments only schematically illustrate the basic conception of the embodiments; therefore the drawings only show the components relevant to the disclosure rather than being drawn according to the number, shape and size of the components during actual implementation. The form, number and scale of each component may be randomly changed during its actual implementation, and the layout of the components thereof might also be more complicated.

The method for identifying a user device in the disclosed embodiments introduces a time factor into the device identification method; and the method calculates a similarity of device records according to all device attribute information constantly changing with time sequences, so as to identify a user device. In a device information database, each device record is associated with one timestamp, recording and describing attribute information of a device at the timestamp.

Based on attribute information characteristics of user devices and the actual experience and intuitive understanding in real life, the disclosure makes the following two basic assumptions.

Assumption 1: the difference between device attributes decreases over time.

This assumption reflects the changing nature of device attribute differences. After an attribute of a user device changes, the difference degree of attribute values does not remain unchanged, but rather decays over time. Therefore, the disclosed embodiments introduce a decay function for attribute values.

Assumption 2: consecutive changes of a device attribute are meaningless if they occur with an excessively large time interval in between.

This assumption reflects the timeliness of device attribute differences. The attribute change of a user device reflects the activity level of the device; but if consecutive changes of the attributes occur with an excessively large time interval in between, it is far less likely that the change occurs in the same device attribute.

FIG. 1 is a flow diagram illustrating a method for identifying a user device according to some embodiments of the disclosure.

Step S1: Acquire multiple device records ranked in chronological order, wherein the device records comprise various attribute values of a device at a certain time and a corresponding timestamp.

Specifically, multiple device records ranked in chronological order are acquired and denoted by $r_1, r_2, \ldots, r_n$, where $n \geq 1$, r represents a device record, formed by various attribute values of a device and one timestamp, and is specifically expressed as $(a_1, a_2, \ldots a_n, t)$, where $a_i$ represents attribute values, $a_i \in A_i$, and $i \in [1,n]$; A represents a device attribute set and is formed by device attributes, and $A=\{A_1, A_2, \ldots A_n\}$; n represents the number of the device records.

Step S2: Calculate time-domain feature information of a changed attribute value in the device records.

Preferably, the time-domain feature information comprises at least one of the following: a leap time and a stable time. The leap time refers to a time difference between the times of two consecutive device records when a certain attribute value changes; the stable time refers to a duration for which a certain attribute remains unchanged after it leaps.

Specifically, step S2 comprises the following steps:

a) Calculate a Leap Time of an Attribute Value in the Device Records.

Specifically, when a certain attribute value a of a device record $r_i$ is the same as an attribute value a of a device record $r_{i-1}$, it can be known that $simA(r_{i-1} \cdot a, r_i \cdot a)=1$, wherein simA is an attribute similarity function. When a certain attribute value a of the device record $r_i$ is different from an attribute value a of the device record $r_{i-1}$, it can be known that $simA(r_{i-1} \cdot a, r_i \cdot a)=0$. Therefore, this period of time in which the device record $r_{i-1}$ changes to the device record $r_i$ is defined as a leap time of the attribute value a and denoted by $\Delta t_{leap}$, which is expressed as follows:

$$\Delta t_{leap} = r_i \cdot t - r_{i-1} \cdot t$$

Figure 2:
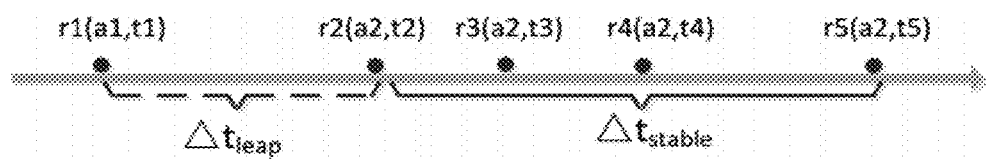
FIG. 2 is a diagram of a leap time and a stable time of an attribute value according to some embodiments of the disclosure.

As shown in FIG. 2, one attribute of the device leaps from $a_1$ to $a_2$, and a corresponding leap time is $\Delta t_{leap} = t_2 - t_1$. A leap time of an attribute reflects the activity level of the device attribute. A large leap time indicates that it is far less likely that two consecutive device records belong to the same device.

Therefore, a threshold $t_{ths}$ is set in one embodiment. When a leap time of an attribute value is greater than the threshold $t_{ths}$, the attribute value is considered to have little influence on the similarity calculation of a device record; and the attribute value will not be used in calculating the device record similarity. In some embodiments, the value of $t_{ths}$ is usually 12 months.

b) Calculate a Stable Time of the Attribute Value in the Device Records.

A stable time of an attribute value refers to a duration for which a certain attribute value of a device record remains unchanged after it leaps, and is denoted by $\Delta t_{stable}$.

For a device record sequence $r_i, r_{i+1}, \ldots, r_j$, where $j \geq i+1$, the attribute a leaps in a device record $r_i$ as compared with a previous device record; and the attribute a leaps in a device record $r_j$ as compared with a subsequent device record. If the attribute a remains unchanged during the period from the time of the device record $r_i$ to the time of the device record $r_j$, a stable time of the attribute a is:

$$\Delta t_{stable} = r_j \cdot t - r_i \cdot t$$

As shown in FIG. 2, the attribute value $a_2$ of the device remains unchanged in a time period $[t_2, t_5]$, and a corresponding stable time is $\Delta t_{stable} = t_5 - t_2$. Over time, an attribute value of the same device changes, including normal system updates and man-made malicious modifications. As the attribute value becomes stabilized, the differences of the attribute before and after the change are minimized. In FIG. 2, having a larger $\Delta t_{stable}$ means having more sufficient historical attribute information for verification, which in turn leads to a lower possibility that $r_1$ and $r_2$ come from two devices; that is, the attribute values $a_1$ and $a_2$ have a smaller difference.

It should be noted that when device records are strictly acquired at a certain time interval, the leap time is a constant, and then only a stable time of an attribute value needs to be calculated in step S2. When a stable time of a device record is a constant, only a leap time of an attribute value needs to be calculated in step S2.

Step S3: Calculate a difference value between values of an attribute before and after change according to the time-domain feature information of the changed attribute value in the device records.

A difference value between device attributes changes over time, with each time point having a time decay factor for a difference value; and the time decay factor is a time-based decay function. Usually, a difference value decays over time; and the farther a difference value is from the current time point, the smaller the difference value.

In order to calculate a similarity between device records, what needs to be considered is the influence a leap time and a stable time of an attribute value of a device have on the similarity of attribute values. Based on the decay of an attribute value difference with a stable time in Assumption 1 and the locality of the change time of an attribute value in the same device in Assumption 2, a difference value function of an attribute used in the present invention is as follows:

$$d(r \cdot a, r' \cdot a) = e^{-\mu \frac{\Delta t_{stable}}{\Delta t_{leap}}}$$

where $d(r \cdot a, r' \cdot a)$ represents a difference value function of an attribute a in device records r and r', and a value range thereof is (0,1]. $\Delta t_{leap}$ and $\Delta t_{stable}$ are a respective leap time and stable time of an attribute value for a; and a preferable time unit is month; $\mu$ is a decay factor for an attribute value difference, and $\mu \in [0,1]$. It should be noted that based on data analysis, the value of $\mu$ is calculated through a statistical model in the case that some service indicators, such as accuracy, are met. In actual use, different values may be selected according to different devices. When the attribute a in the device records r and r' does not change for a certain period of time, i.e., $\mu=0$, then $d(r \cdot a, r' \cdot a)=1$.

Figure 3:
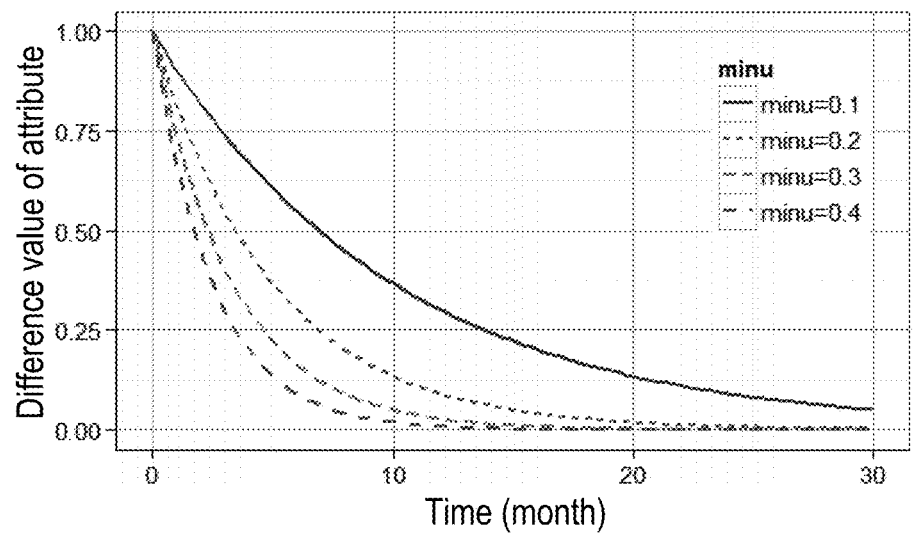
FIG. 3 is a diagram illustrating decay of a difference value of a device attribute with time when a leap time $\Delta t_{leap}=1$ according to some embodiments of the disclosure.

When $\Delta t_{leap}=1$, the decay of the difference value of the attribute is shown in FIG. 3. As can be known from FIG. 3, the smaller the $\mu$ is, the slower the difference value of the attribute decays.

When the leap time is a constant, the difference value function of the attribute used in the present invention may be simplified as:

$$d(r \cdot a, r' \cdot a) = e^{-\mu \frac{\Delta t_{stable}}{\Delta t_{leap}}}$$

where $\Delta t_{leap}$ is the leap time of the attribute value of a and is a constant; $\Delta t_{stable}$ is the stable time of the attribute value of a; au is the decay factor of the attribute value difference.

Step S4: Calculate a similarity of the device records according to difference values of all attributes in the device records.

In one embodiment, step S4 comprises the following steps:

a) Define a weight of a similarity for a certain attribute a in device records r and r' as $w(r \cdot a, r' \cdot a) = d(r \cdot a, r' \cdot a)$, where $d(r \cdot a, r' \cdot a)$ is the difference value function of the attribute a in the device records r and r', and is acquired in step S3. It can be known that a value range of $w(r \cdot a, r' \cdot a)$ is (0,1]. That is to say, when an attribute changes, a weight of a similarity for the attribute is a difference value $d(r \cdot a, r' \cdot a)$ of the attribute. As time goes by, the difference of the changed attribute value decreases; at the same time, a proportion of the apportioned weight decreases accordingly. When an attribute does not change, a weight of a similarity for the attribute is 1.

b) Calculate a similarity of the device records r and r' according to a device record similarity equation $$simR(r, r') = \frac{\sum_{a \in A} w(r \cdot a, r' \cdot a) * simA(r \cdot a, r' \cdot a)}{\sum_{a \in A} w(r \cdot a, r' \cdot a)}$$

where A is a device attribute set; and simA(r·a,r'·a) is a similarity of the certain attribute a in the device records r and r'.

Step S5: Identify whether the device records belong to an identical device according to the similarity of the device records.

Specifically, in the disclosed embodiments, a similarity threshold is set, and it is determined whether a similarity of device records is greater than the similarity threshold. If yes, it is determined that the two device records belong to the same device; and if not, it is determined that the two device records belong to different devices, and different IDs are allocated to the different devices.

In one embodiment, a similarity threshold is set as θ=0.7; that is, when a similarity of two device records exceeds 0.7, it is determined that the two device records are records of the same device; and the two device records correspond to the same device ID; when a similarity of two device records is less than or equal to 0.7, it is determined that the two device records belong to different devices; and different IDs are allocated to the different devices.

Methods for identifying a user device are further illustrated below with reference to a specific example.

An example of a user using an ANDROID-type of mobile device is used for illustration here; the following device attributes are selected: a MAC address, an ANDROID ID, and a device model. The MAC address is a network interface, such as Wi-Fi and Bluetooth, of the mobile device. The user may change his MAC address through tools like MAC ADDRESS GHOST. The ANDROID ID is a 64-bit string that is randomly generated; and this value may change when the user chooses to restore a device to factory defaults. The device model usually includes GT, HTC, NEXUS, and so on. User device records are shown in Table 1.

TABLE 1

USER DEVICE RECORDS

| | MAC address | ANDROID ID (AID) | Model | Time |
|---|---|---|---|---|
| $r_1$ | 00:1a:24:34:9f:21 | 9774d56d682e549c | GALAXY | 2010-04 |
| $r_2$ | 00:1a:24:34:9f:21 | 3dcc3d9765e7f1db | GALAXY | 2010-08 |
| $r_3$ | 00:1a:24:f0:aa:97 | 3dcc3d9765e7f1db | GALAXY | 2010-12 |
| $r_4$ | 00:1a:24:f0:aa:97 | 3dcc3d9765e7f1db | GALAXY | 2011-06 |
| $r_5$ | 00:1a:24:f0:aa:97 | 3dcc3d9765e7f1db | GALAXY | 2012-04 |
| $r_6$ | 00:0f:aa:0e:61:43 | 23d65e76338f743a | NEXUS | 2012-05 |
| $r_7$ | 00:0f:aa:0e:61:43 | 637fe67c812e3feb | NEXUS | 2014-07 |

First, multiple device records ranked in chronological order are acquired as illustrated in the "Time" column.

Two models of mobile devices can be seen from the table above; and it can be derived that $\{r_3, r_4, r_5\}$ come from the same device because attribute information of the three device records are completely the same. Therefore, one device ID can be generated and allocated to the three device records, and is denoted by DID1$\{r_3, r_4, r_5\}$.

The device record $r_2$ is only different from the device records in DID1 in that its MAC address is different. According to a traditional device record similarity algorithm, if the similarity weights of all device attributes are 1, a similarity between changed attributes is 0, and a similarity between unchanged attributes is 1, then $$simR(r_2, r_3) = \frac{1*0 + 1*1 + 1*1}{1+1+1} = 0.67,$$

which is less than the similarity threshold θ=0.7; and it is then determined that $r_2$ and $r_3$ come from different devices and need to be allocated with different IDs.

According to the device record similarity algorithm in the disclosure, a similarity weight of an unchanged attribute is 1. A similarity weight of a changed attribute is a difference value of the attribute. Specifically, $\Delta t_{stable} = r_5 \cdot t - r_3 \cdot t = 16$, $\Delta t_{leap} = r_3 \cdot t - r_2 \cdot t = 4$, μ is assumed to be 0.075, and a difference value of the MAC attribute is obtained $$d(r_2 \cdot MAC, r_3 \cdot MAC) = e^{-0.075 \frac{16}{4}}.$$

Therefore, a similarity weight of the attribute is w($r_2$·MAC, $r_3$·MAC)=0.74; at this time, the similarity of $r_2$ and $r_3$ is:

$$simR(r_2, r_3) = \frac{0.74*0 + 1*1 + 1*1}{0.74+1+1} = 0.73,$$

which is greater than the similarity threshold θ=0.7; and it is determined that $r_2$ and $r_3$ come from the same device and $r_2$ is added to DID1. In view of the above, in the disclosed embodiments, a similarity of device records is determined based on a similarity weight constantly adjusted with time sequences, greatly reducing the misjudgment rate, thereby avoiding allocating multiple IDs to one single device.

Similarly, the ANDROID ID $r_1$ is different from the Android ID $r_2$ in DID1$\{r_2, r_3, r_4, r_5\}$. First, a weight of the changed AID attribute is calculated, wherein $\Delta t_{table} = r_5 \cdot t - r_2 \cdot t = 20$ and $\Delta t_{leap} = r_2 \cdot t - r_1 \cdot t = 4$; and a difference value of the AID attribute is obtained as $$d(r_2 \cdot AID, r_3 \cdot AIR) = e^{-0.075 \frac{20}{4}} = 0.69;$$

and then the weight is w($r_2$·AID, $r_3$·AID)=0.69. At this time, the similarity of $r_1$ and $r_2$ is:

$$simR(r_1, r_2) = \frac{1*1 + 0.69*0 + 1*1}{1 + 0.69 + 1} = 0.74,$$

which is greater than the similarity threshold θ=0.7, and it is determined that $r_1$ and $r_2$ come from the same device; and $r_1$ is added to DID1, so now we have DID1$\{r_1, r_2, r_3, r_4, r_5\}$.

The device records $r_6$ and $r_7$ are the same type of NEXUS mobile device, but $\Delta t_{leap} = r_7 \cdot t - r_6 \cdot t = 26 > 12 = t_{ths}$; and there is not enough historical information to judge whether they come from the same device; therefore, the two device information records are temporarily allocated with two different device IDs, i.e., DID2$\{r_6\}$ and DID3$\{r_7\}$.

Additionally, assuming that $r_2$ does not exist, then when determining whether $r_1$ and $r_3$ belong to the same device, the similarity weights of the changed attributes MAC and AID need to be calculated respectively because the attribute value AID changes from $r_1$ to $r_3$. When $$w(r_1 \cdot MAC, r_3 \cdot MAC) = d(r_1 \cdot MAC, r_3 \cdot MAC) = e^{-0.075 \frac{16}{8}} = 0.86,$$

then the similarity of $r_1$ and $r_3$ is:

$$simR(r_1, r_3) = \frac{0.86*0 + 0.86*0 + 1*1}{0.86 + 0.86 + 1} = 0.367,$$

which is less than the similarity threshold θ=0.7; and it is determined that $r_1$ and $r_3$ come from different devices. This conclusion is completely opposite to the aforementioned conclusion. It can be known that in order to accurately judge whether two device records belong to the same device, enough historical device record information needs to be further provided. Therefore, the more historical device record information is provided, the lower the misjudgment rate of the device records is.

Figure 4:
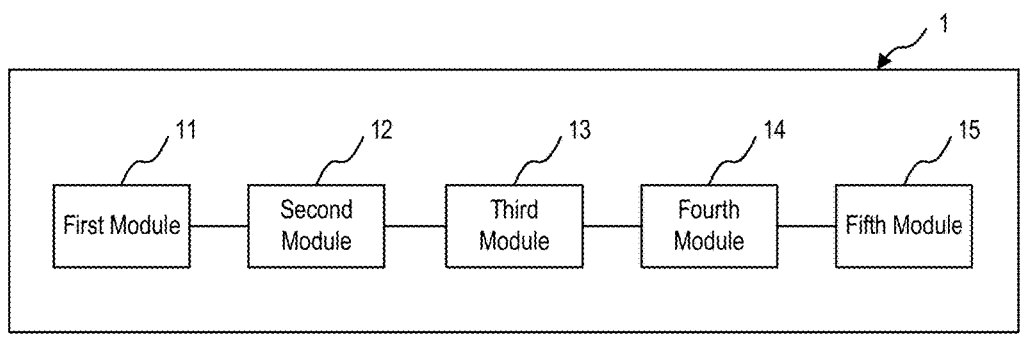
FIG. 4 is a block diagram illustrating a system for identifying a user device according to some embodiments of the disclosure.

FIG. 4 is a block diagram illustrating a system for identifying a user device according to some embodiments of the disclosure. A system 1 for identifying a user device in the present invention comprises a first module 11, a second module 12, a third module 13, a fourth module 14, and a fifth module 15. In some embodiments, the system 1 may be implemented as one or more servers or network devices.

The first module 11 is configured to acquire multiple device records ranked in chronological order, wherein the device record comprises various attribute values of a device at a certain time and a corresponding timestamp.

Specifically, the first module 11 acquires multiple device records ranked in chronological order, denoted by $r_1$, $r_2, \ldots, r_n$, where n≥1. r represents a device record, formed by various attribute values of a device and one timestamp, and is specifically expressed as $(a_1, a_2, \ldots a_n, t)$, where $a_i$ represents an attribute value, $a_i \in A_i$. Specifically, the first module 11 acquires multiple device records ranked in chronological order, denoted by $r_1, r_2, \ldots, r_n$, where n≥1. r represents a device record, formed by various attribute values of a device and one timestamp, and is specifically expressed as $(a_1, a_2, \ldots a_n, t)$, where $a_i$ represents an attribute value, $a_i \in A_i$, and i∈[1, n]; A represents a device attribute set, formed by device attributes, and A={$A_1, A_2, \ldots A_n$}; n represents the number of the device records.

The second module 12 is configured to calculate time-domain feature information of a changed attribute value in the device records.

In one embodiment, the time-domain feature information comprises at least one of the following: a leap time and a stable time. The leap time refers to a time difference between the times of two consecutive device records when a certain attribute value changes and the stable time refers to a duration for which a certain attribute remains unchanged after it leaps.

Specifically, the second module 12 comprises a leap time calculation module and a stable time calculation module. The leap time calculation module is configured to calculate a time difference between the times of two consecutive device records when a certain attribute value changes. The stable time calculation module is configured to calculate a duration for which a certain attribute remains unchanged after it leaps.

Specifically, when a certain attribute value a of a device record $r_i$ is the same as an attribute value a of a device record $r_{i-1}$, it can be known that simA($r_{i-1}$·a, $r_i$·a)=1. When a certain attribute value a of the device record $r_i$ is different from an attribute value a of the device record $r_{i-1}$, it can be known that simA($r_{i-1}$·a, $r_i$·a)=0. Therefore, the leap time calculation module defines this period of time in which the device record $r_{i-1}$ changes to the device record $r_i$ as a leap time of the attribute value a, which is denoted by $\Delta t_{leap}$, and expressed as follows:

$$\Delta t_{leap} = r_i \cdot t - r_{i-1} \cdot t$$

Additionally, a threshold $t_{ths}$ is set. When a leap time of an attribute value is greater than the threshold $t_{ths}$, the attribute value is considered to have little influence on the similarity calculation of a device record; and the attribute value will not be used in calculating the device record similarity. In some embodiments, the value of $t_{ths}$ is usually 12 months.

The stable time calculation module defines a stable time of an attribute value as a duration for which a certain attribute value of a device record remains unchanged after it leaps, which is denoted by $\Delta t_{stable}$.

For a device record sequence $r_i, r_{i+1}, \ldots, r$, where j≥i+1, the attribute a leaps in a device record $r_i$ as compared with a previous device record; and the attribute a leaps in a device record $r_j$ as compared with a subsequent device record. If the attribute a remains unchanged in the period from the device record $r_i$ to the device record $r_j$, the stable time calculation module calculates a stable time of the attribute a using the following equation:

$$\Delta t_{stable} = r_j \cdot t - r_i \cdot t$$

Over time, an attribute value of the same device changes, including normal system updates and man-made malicious modifications. As the attribute value become stabilized, the differences of the attribute before and after the change are minimized. Having a larger $\Delta t_{stable}$ means having more sufficient historical attribute information for verification, which in turn leads to a lower possibility that $r_1$ and $r_2$ come from two devices.

It should be noted that when device records are strictly acquired at a certain time interval, the leap time is a constant; and the second module 12 only needs to calculate a stable time of an attribute value. When a stable time of a device record is a constant, the second module 12 only needs to calculate a leap time of an attribute value.

The third module 13 is configured to calculate a difference value between values of an attribute before and after change according to the time-domain feature information of the changed attribute value in the device records.

In order to calculate a similarity between device records, what needs to be considered is the influence a leap time and a stable time of an attribute value of a device have on the similarity of attribute values. Based on the decay of the attribute value difference with the stable time in Assumption 1 and the locality of the change time of an attribute value in the same device in Assumption 2, a difference value function used by the third module 13 is as follows:

$$d(r \cdot a, r' \cdot a) = e^{-\mu \frac{\Delta t_{stable}}{\Delta t_{leap}}}$$

d(r·a, r'·a) represents a difference value function of an attribute a in device records r and r', and a value range thereof is (0, 1]. $\Delta t_{leap}$ and $\Delta t_{stable}$ are a respective leap time and stable time of an attribute value for a; and a preferable time unit is month; μ is a decay factor for an attribute value difference, and μ∈[0, 1]. It should be noted that based on data analysis, the value of μ is calculated through a statistical model in the case that some service indicators, such as accuracy, is met. In actual use, different values may be selected according to different devices. When the attribute a in the device records r and r' does not change for a certain period of time, i.e., μ=0, then d(r·a, r'·a)=1.

When the leap time is a constant, the difference value function of the attribute used in the present invention may be simplified as:

$$d(r \cdot a, r' \cdot a) = e^{-\mu \frac{\Delta t_{stable}}{\Delta t_{leap}}}$$

$t_{leap}$ is the leap time of the attribute value of a and is a constant; $\Delta t_{stable}$ is the stable time of the attribute value of a; μ is the decay factor of the attribute value difference.

The fourth module 14 is configured to calculate a similarity of the device records according to difference values of all attributes in the device records.

Specifically, when calculating the similarity of the device records, the fourth module 14 adopts the following steps:

a) Define a weight of a similarity for a certain attribute a in device records r and r' as w(r·a,r'·a)=d(r·a,r'·a).

d(r·a,r'·a) is the difference value function of the attribute a in the device records r and r', and is acquired in step S3. It can be known that a value range of w(r·a,r'·a) is (0, 1]. That is to say, when an attribute changes, a weight of a similarity for the attribute is a difference value d(r·a,r'·a) of the attribute. As time goes by, the difference of the changed attribute value decreases; at the same time, a proportion of the apportioned weight decreases accordingly.

When an attribute does not change, a weight of a similarity for the attribute is 1.

b) Calculate a similarity of the device records r and r' according to a device record similarity equation $$simR(r, r') = \frac{\sum_{a \in A} w(r \cdot a, r' \cdot a) * simA(r \cdot a, r' \cdot a)}{\sum_{a \in A} w(r \cdot a, r' \cdot a)}$$

where A is a device attribute set; and simA(r·a, r'·a) is a similarity of the certain attribute a in the device records r and r'.

The fifth module 15 is configured to identify whether the device records belong to an identical device according to the similarity of the device records.

Specifically, in the illustrated embodiment, a similarity threshold is set; and the fifth module 15 determines whether a similarity of device records is greater than the similarity threshold; if yes, it is determined that the two device records belong to the same device; and if not, it is determined that the two device records belong to different devices; and different IDs are allocated to the different devices.

In one embodiment, a similarity threshold is set as θ=0.7; that is, when a similarity of two device records exceeds 0.7, it is determined that the two device records are records of the same device; and the two device records correspond to the same device ID; when a similarity of two device records is less than or equal to 0.7, it is determined that the two device records belong to different devices; and different IDs are allocated to the different devices.

In view of the above, in the methods and systems for identifying a user device, a stable time and a leap time of a device attribute are defined to acquire a difference value of the device attribute, and the difference value is used as a weight of a similarity for the device attribute. Based on all attributes of a device, a similarity of device records is precisely calculated through a similarity weight that can be constantly adjusted with time sequences, thereby effectively reducing the misjudgment rate. The disclosed embodiments effectively overcome various disadvantages in current systems and therefore have high industrial applicability.

The aforementioned embodiments only illustratively describe the principle and efficacy of the disclosed embodiments, rather than being used to limit the embodiments. Any person skilled in the art may modify or amend the aforementioned embodiments without departing from the spirit and scope of the disclosure. Thus, all equivalent modifications or amendments made by those having common knowledge in the technical field without departing from the spirit and technical thoughts revealed by the disclosure shall still be covered by the claims.

To those skilled in the art, it is apparent that the disclosure is not limited to the details of the aforementioned exemplary embodiments, and can be implemented in other specific forms without departing from the spirit or basic features of the disclosure. Therefore, no matter which perspective is taken, the embodiments should be regarded as exemplary and non-restrictive; the scope of the disclosure is defined by the appended claims, rather than defined by the above description, and therefore it is intended that the disclosure covers all variations falling within the meaning and scope of equivalent elements of the claims. No reference symbols in the claims should be regarded as limiting the involved claims. Additionally, it is apparent that the term "include/comprise" does not exclude other units or steps, and singularity does not exclude plurality. A plurality of units or devices stated in a device claim may also be implemented by one unit or device through software or hardware. Terms such as first and second are used to indicate names, rather than indicating any particular sequence.

What is claimed is:

1. A method comprising:
    acquiring, by a server, multiple device records, wherein a device record comprises attribute values of a device at a certain time and a corresponding timestamp;
    calculating, by the server, time-domain feature information of a changed attribute value in the device records, the time-domain feature information comprising feature information selected from the group consisting of a leap time of the changed attribute value and a stable time of the changed attribute value, the stable time comprising a length of time between two device record timestamps when the changed attribute value remains unchanged after the changed attribute value has previously changed;
    calculating, by the server, a difference value between values of the changed attribute before and after a change based on the time-domain feature information of the changed attribute value in the device records;
    calculating, by the server, a similarity of the device records associated with the changed attribute according to difference values of attributes in the device records; and
    identifying, by the server, whether the device records associated with the changed attribute belong to the same device according to the similarity of the device records.

2. The method of claim 1, wherein the leap time comprises a time difference between timestamps of two consecutive device records when a certain attribute value changes and the stable time comprises a duration for which a certain attribute remains unchanged after it changes.

3. The method of claim 1, wherein an attribute value having a corresponding leap time less than or equal to a predetermined threshold is used when the similarity of the device records is calculated.

4. The method of claim 1, further comprising:
setting, by the server, a similarity threshold when an ID is allocated to a device according to the similarity of the device records;
determining, by the server, that the two device records belong to the same device if a similarity of two device records is greater than the similarity threshold; and
determining, by the server, that the two device records belong to different devices and allocating different IDs to the different devices if a similarity of two device records is less than or equal to than the similarity threshold.

5. The method of claim 1 wherein a device record includes one or more of a MAC address, device identifier, and device model identifier.

6. The method of claim 1, wherein the leap time comprises a length of time between two device record timestamps when the changed attribute value changes.

7. The method of claim 1, wherein the stable time comprises a length of time between two device record timestamps when the changed attribute value remains unchanged after the changed attribute value has previously changed.

8. The method of claim 1, wherein the difference value between values of an attribute before and after change is calculated using a decay function, the decay function calculating the difference value based on the leap time, stable time, and a decay factor.

9. The method of claim 1, wherein calculating a similarity of the device records according to difference values of attributes in the device records comprises:
defining a weight of similarity for the changed attribute value in the device records based on a difference value of the changed attribute value; and
calculating a similarity of the device records based on the weight of similarity and a weighting of the changed attribute value with respect a device attribute set.

10. An apparatus comprising:
a processor; and
a non-transitory memory storing computer-executable instructions therein that, when executed by the processor, cause the apparatus to perform the operations of:
acquiring multiple device records, wherein a device record comprises attribute values of a device at a certain time and a corresponding timestamp;
calculating time-domain feature information of a changed attribute value in the device records, the time-domain feature information comprising feature information selected from the group consisting of a leap time of the changed attribute value and a stable time of the changed attribute value, the stable time comprising a length of time between two device record timestamps when the changed attribute value remains unchanged after the changed attribute value has previously changed;
calculating a difference value between values of the changed attribute before and after a change based on the time-domain feature information of the changed attribute value in the device records;
calculating a similarity of the device records associated with the changed attribute according to difference values of attributes in the device records; and
identifying whether the device records associated with the changed attribute belong to the same device according to the similarity of the device records.

11. The apparatus of claim 10, wherein the leap time comprises a time difference between timestamps of two consecutive device records when a certain attribute value changes and the stable time comprises a duration for which a certain attribute remains unchanged after it changes.

12. The apparatus of claim 10, wherein the leap time comprises a length of time between two device record timestamps when the changed attribute value changes.

13. The apparatus of claim 10, wherein an attribute value having a corresponding leap time less than or equal to a predetermined threshold is used when the similarity of the device records is calculated.

14. The apparatus of claim 10, wherein the difference value between values of an attribute before and after change is calculated using a decay function, the decay function calculating the difference value based on the leap time, stable time, and a decay factor.

15. The apparatus of claim 10, wherein calculating a similarity of the device records according to difference values of attributes in the device records comprises:
defining a weight of similarity for the changed attribute value in the device records based on a difference value of the changed attribute value; and
calculating a similarity of the device records based on the weight of similarity and a weighting of the changed attribute value with respect a device attribute set.

16. The apparatus of claim 10, further comprising:
setting a similarity threshold when an ID is allocated to a device according to the similarity of the device records;
determining that the two device records belong to an identical device if a similarity of two device records is greater than the similarity threshold; and
determining that the two device records belong to different devices and allocating different IDs to the different devices if a similarity of two device records is less than or equal to than the similarity threshold.

17. The apparatus of claim 10, wherein a device record includes one or more of a MAC address, device identifier, and device model identifier.

* * * * *